Patented May 27, 1952

2,598,283

UNITED STATES PATENT OFFICE 2,598,283

COPOLYMERS OF PERFLUOROPROPENE AND TETRAFLUOROETHYLENE AND METHOD OF MAKING SAME

William T. Miller, Ithaca, N. Y., assignor to the United States of America as represented by the United States Atomic Energy Commission No Drawing. Application October 23, 1947, Serial No. 781,768

5 Claims. (Cl. 18—55)

The present invention relates to chemical substances composed chiefly of carbon and fluorine and to methods of making such substances. More particularly, the invention relates to a method of copolymerizing certain fluorocarbon monomers to produce a novel product having important industrial applications.

For a long time there has been a search for a material which can be used to construct useful articles and which at the same time possesses chemical and thermal stability of a high order. The need for construction materials resistant to the action of highly corrosive substances, to the deteriorating effects of oxygen and light, and to the dissolving action of various materials has been great. In chemical processing the action of acids, alkalis, oxidizing agents, reducing agents, corrosive halides, and the like have imposed serious and expensive limitations upon processing equipment. Whereas it has been possible in most cases to employ resistant metals, alloys, ceramics, carbon or other materials resistant to the particular agents involved for the construction of the principal processing equipment, it has been difficult to find materials possessed of the property of resiliency desirable for equipment gaskets, valve seats and the like and further to find materials possessing the property of transparency for use as sight glasses, observation windows, instrument covers, etc. Aside from these applications in the presence of strong chemical agents, there are other equally critical needs for resilient and in some cases for transparent materials which have great resistance to the solvent action of various substances, or have good electrical insulating properties.

Recently there has been produced a plastic possessing some of these desired properties. This material is known as polytetrafluoroethylene. Although the substance is quite stable chemically and is useful for many of the industrial purposes indicated, it has been found difficult to fabricate, is undesirably soft for some purposes, lacks sufficient mechanical strength for many uses, is waxy in texture and tends to be generally opaque except in very thin sections.

There has also been produced recently a plastic possessing some other of the aforementioned desired properties. This plastic is known as polytrifluorochloroethylene. Polytrifluorochloroethylene, unlike polytetrafluoroethylene, is readily fabricated as a thermoplastic, is resilient and transparent in relatively thick sections but does not have quite as high chemical stability or as low power loss when subjected to a high frequency electrical field as the fully fluorinated polytetrafluoroethylene and is more readily swelled by certain solvents.

It is therefore an object of the invention to provide polymeric materials of high chemical stability.

Another object of the invention is to provide a substantially completely fluorinated plastic material combining the properties of chemical stability and mechanical characteristics which render it workable and useful in many practical applications.

A specific object of the invention is to provide chemically stable thermoplastic materials consisting chiefly of carbon and fluorine.

The above and other objects will become apparent in the course of the following description and will be pointed out more particularly in the claims.

Broadly the present invention comprises a method of copolymerizing tetrafluoroethylene and perfluoropropene and the product produced by this method. By the copolymerization of perfluoropropene and tetrafluoroethylene, there is produced a substantially completely fluorine substituted polyhalocarbon. Such a substance is termed a perfluorocarbon.

Perfluorocarbons, considered as chemical entities, may be defined as compounds consisting exclusively of carbon and fluorine, with any degree of saturation. When it is sought to prepare them by the methods which will be set forth in the ensuing description, products may be obtained which are not absolutely pure; thus they may contain a proportion of polymer chains having elements other than carbon or fluorine, derived from materials utilized in the synthesis other than the monomer which is polymerized, e. g., from a promoter, solvent medium or other adjunct to the polymerization. The term perfluorocarbon is defined as a compound consisting of fluorine and carbon. The polymers produced from such perfluorocarbons are, in general, above 98 per cent pure based on the weight of the sample.

The perfluorocarbons comprise a relatively new class of compounds that possess wide commercial utility by reason of their unique chemical and physical properties. As in the case of the hydrocarbons the lower members of the series are gases at ordinary temperatures, the intermediate members are liquids and with advancing molecular weights the compounds pass through the ranges of greases, waxes and up to high melting solids. The saturated perfluorocarbons have exceptional thermal and chemical stability, being noninflammable and substantially chemically inert with a variety of boiling points and other desirable physical properties. The fluorocarbon bond is non-oxidizable and reducible with great difficulty, and under conditions ordinarily encountered replacement reactions do not occur in these polyhalogen saturated compounds.

In one of its more important aspects the composition of the present invention comprises a plastic which, in contrast to the aforementioned polytetrafluoroethylene, is relatively easy to fabricate, has high resiliency and is transparent in relatively thick sections. The composition is a perfluorocarbon and it thus combines the very high chemical stability and low electrical power loss properties of plastics such as polytetrafluoroethylene with the desirable mechanical properties of plastics such as polytrifluorochloroethylene.

One of the most important products of the present invention is a high molecular weight copolymer of tetrafluoroethylene and perfluoropropene. The copolymerization of these monomers to provide the present polymer can be performed in a variety of ways. Conditions favorable to the polymerization include the use of elevated temperatures and pressures, and the use of a polymerization promoter under suitable selected conditions of pressure, temperature and time. Other effective polymerization procedures include the use of high pressures with and without added polymerization promoters and ultraviolet light. Some of these methods are disclosed in my applications, Serial No. 601,387, filed June 25, 1945 and Serial No. 730,176, filed February 21, 1947.

As was discussed more fully in the aforementioned application, Serial No. 730,176, the conditions used in the polymerization can be selected to control the average chain length of the polymer and the distribution of the polymer molecules of various chain lengths in the production so as to vary the properties of the product as to softening point, strength, and fabricating characteristics.

Polymerization may be carried out in a continuous manner by pumping the monomers and promoter through a tube maintained at the desired reaction temperature by an outside bath.

To vary the molecular weight distribution of a product, the product of the copolymerization may be blended with other polymers. Hot milling is a procedure which may be used for this purpose.

When transparency is desired the product of the copolymerization may be hot pressed above its melting point and then fast cooled as by quenching in water or other coolant.

A preferred method for performing the polymerization involves the use of bis-trichloroacetyl peroxide as a promoter and the use of moderate pressures and low temperatures during the polymerization. In order to illustrate the manner in which the present method can be carried out, a specific example of this process is set out below.

A weighed quantity of the solution of bis-trichloroacetyl peroxide [$(CCl_3CO)_2O_2$] in trichlorofluoromethane solvent was charged into an evacuated glass polymerization bomb at $-30°$ C. The bomb was then again evacuated to a low pressure to remove most of the trichlorofluoromethane. Perfluoropropene ($CF_3-CF=CF_2$), purified by distillation from phosphorus pentoxide and tetrafluoroethylene ($CF_2=CF_2$), purified by distillation through sulfuric acid and phosphorus pentoxide were charged into the bomb at liquid air temperatures. The contents of the bomb aside from possibly a small amount of trichlorofluoromethane thus comprised the reactants and promoter in approximately the following quantities: $CF_3-CF=CF_2$—32.2 grams; $CF_2=CF_2$—3.6 grams; $(CCl_3CO)_2O_2$—0.068 gram. The bomb was pumped to a low pressure, sealed, and the temperature then raised to approximately $-16°$ C. The bomb was maintained under these conditions for 10 days to permit the polymerization reaction to proceed.

The non-volatile product of the above reaction comprised 2.9 grams of a chemically stable solid copolymer which consisted substantially of carbon and fluorine. The product was compressed about 26.8 percent when a 0.25 inch diameter area of a ⅝ inch diameter sample, 18 mils thick, was subjected to a pressure of about 1000 p. s. i. at 125° C. for about 10 minutes. Upon release of the pressure, the compressed product recovered about 77.8 percent of its reduction in thickness in about 10 minutes. The product thus retained a deformation at this temperature of about 5.9 percent. Repeated compression under the same conditions resulted in only a very small additional retained distortion. Additional slow recovery was observed when the sample was permitted to stand at 125° C.

The product was thermoplastic as was illustrated by pressing it into transparent sheets at temperatures between 300° and 350° C. At these temperatures it does not noticeably decompose during the time required for fabrication.

The copolymer thus has the thermoplastic properties of plastics such as polytrifluorochloroethylene and in addition has the high chemical stability of perfluorocarbons, being chemically inert to most organic and inorganic substances under ordinary use conditions. It may be further characterized by the possession of a low electrical loss factor and low neutron absorption, characteristics of perfluorocarbons in general. It may be used for a wide variety of purposes where its chemical stability or transparency are useful properties, for example, laboratory test tubes, beakers, bottles and the like may be made by the use of pressure and molding methods. Tubes of various size may be made by extrusion methods, other equipment and parts may be made by machining, etc. Other articles may be made from the plastic, including gaskets, valve seats, insulators, transparent sheets and machine parts. Special properties may be imparted to the polymer by working fillers such as metal powders, pigments and coloring agents, into it.

Among the valuable copolymers of the present invention from the standpoint of mechanical properties, are plastic solids which undergo a distortion of less than 50 percent when a pressure of approximately 1000 lb./in.$^2$ is applied to them at 125° C. The term "plastic" is reserved in the present application to those copolymers which demonstrate properties of substantial mechanical strength and to distinguish from lower molecular weight solid copolymers which are preferably designated as waxes.

Although the solid plastic copolymers are among the most valuable which may be produced, because of their properties as pointed out above, copolymers in the liquid and wax range are also widely applicable.

Since many embodiments might be made of the above described invention and since many changes might be made in the embodiment illustratively disclosed herein, it is to be understood that all matter hereinabove set forth is to be

I claim:

1. A method of preparing a high molecular weight solid perfluorocarbon which comprises copolymerizing perfluoropropene and tetrafluoroethylene in the presence of trichloroacetyl peroxide at a temperature sufficiently low to produce a high molecular weight solid plastic.

2. A method of preparing a high molecular weight solid perfluorocarbon which comprises copolymerizing perfluoropropene and tetrafluoroethylene in the presence of trichloroacetyl peroxide at temperatures less than 0° C.

3. A method of preparing a high molecular weight solid perfluorocarbon which comprises copolymerizing perfluoropropene and tetrafluoroethylene in the presence of trichloroacetyl peroxide at −16° C.

4. A solid thermoplastic copolymer of tetrafluoroethylene and perfluoropropene containing tetrafluoroethylene and perfluoropropene monomers in the ratio of 1 to 9 having a distortion less than 50 per cent at a pressure of approximately 1000 p. s. i. at 125° C.

5. The method of preparing transparent sheets of a solid plastic copolymer of tetrafluoroethylene and perfluoropropene which comprises pressing such a solid copolymer into sheets at a temperature between about 300 and about 350° C. and then rapidly cooling said sheets.

WILLIAM T. MILLER.

REFERENCES CITED

The following references are of record in the file of this patent:

UNITED STATES PATENTS

| Number | Name | Date |
|---|---|---|
| 2,054,115 | Abrams | Sept. 15, 1936 |
| 2,468,664 | Hanford | Apr. 26, 1949 |
| 2,531,134 | Kropa | Nov. 21, 1950 |
| 2,549,935 | Sauer | Apr. 24, 1951 |